United States Patent [19]

Chen

[11] Patent Number: 4,768,870

[45] Date of Patent: Sep. 6, 1988

[54] COMBINED LOUDSPEAKER AND MOTORCYCLE DRIVING MIRROR

[76] Inventor: Jimmy Chen, 5F., No. 31, Lane 44, Tai Ho Street, Chung Ho, Raipei Hsien, Taiwan

[21] Appl. No.: 101,385

[22] Filed: Sep. 28, 1987

[51] Int. Cl.⁴ .......................... B60R 1/12; H04B 1/08; G02B 7/18; G02B 5/08
[52] U.S. Cl. .................................... 350/631; 350/600; 455/350; 381/86; 381/90; 381/205
[58] Field of Search ............... 350/631, 600, 607, 609, 350/641, 590; 455/350, 347, 345, 344; 381/86, 90, 111, 205

[56] References Cited

U.S. PATENT DOCUMENTS

| | | | |
|---|---|---|---|
| 3,099,797 | 7/1963 | Piccinini | 350/631 |
| 3,950,701 | 4/1976 | Matuoka et al. | 350/631 |
| 4,445,228 | 4/1984 | Bruni | 455/345 |

Primary Examiner—Jon W. Henry
Attorney, Agent, or Firm—Bacon & Thomas

[57] ABSTRACT

A combined loudspeaker and motorcycle driving mirror is formed within a housing, which fixed on one or both of the handlebars of a motorcycle. The loudspeaker is installed on a seat for the motorcycle driving mirror. Such that it can achieve double functions, as an audio component, and a motorcycle driving mirror.

2 Claims, 3 Drawing Sheets

COMBINED LOUDSPEAKER AND MOTORCYCLE DRIVING MIRROR

BACKGROUND OF THE INVENTION

The present invention relates to a combined loudspeaker and motorcycle driving mirror, and more particularly, relates to a special driving mirror apparatus mounted on one or both of the handlebars of a motorcycle.

As is well known, no audio component design has been developed for motorcycles. If the riders would like to enjoy music while driving, there are two alternatives to achieve the goal. One is to put on a headphone together with a WALKMAN, and the other is to install a car stereo with loudspeaker in the motorcycle tool box of scooters.

The former is too dangerous and may cause the riders to substantially ignore the traffic condition. The latter is merely restricted to large capacity scooters, and the installation of loudspeaker in the motorcycle tool box not only occupies the tool box but also causes difficulty in assembling. Therefore, the above conventional methods are impractical.

SUMMARY OF THE INVENTION

A primary objective of the present invention is to provide a combined loudspeaker and motorcycle driving mirror which provides with double functions. One is audio component device, and the other is the motorcycle driving mirror.

Another objective of the present invention is to provide a combined loudspeaker and motorcycle driving mirror which is easily manufactured and assembled.

Still another objective of the present invention is to provide a combined loudspeaker and motorcycle driving mirror which occupies a small space for installation and is low cost in manufacture.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
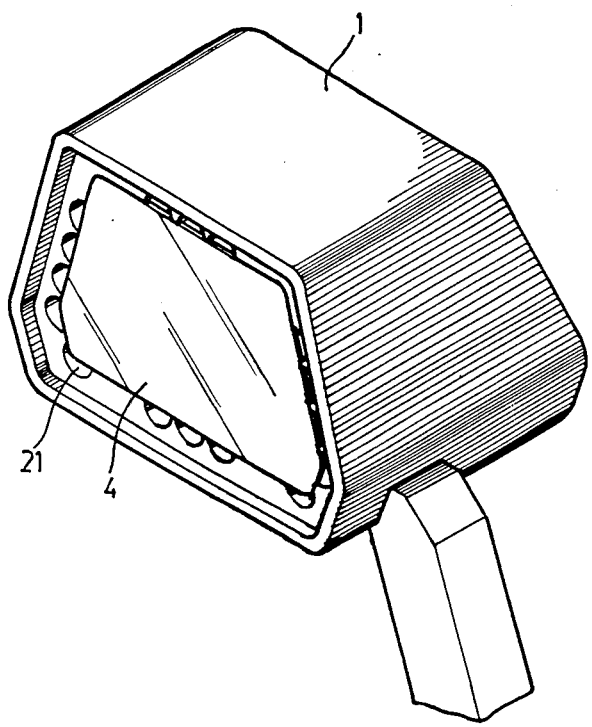
FIG. 1 is a perspective view of a combined loudspeaker and motorcycle driving mirror in accordance with the present invention.
Figure 2:
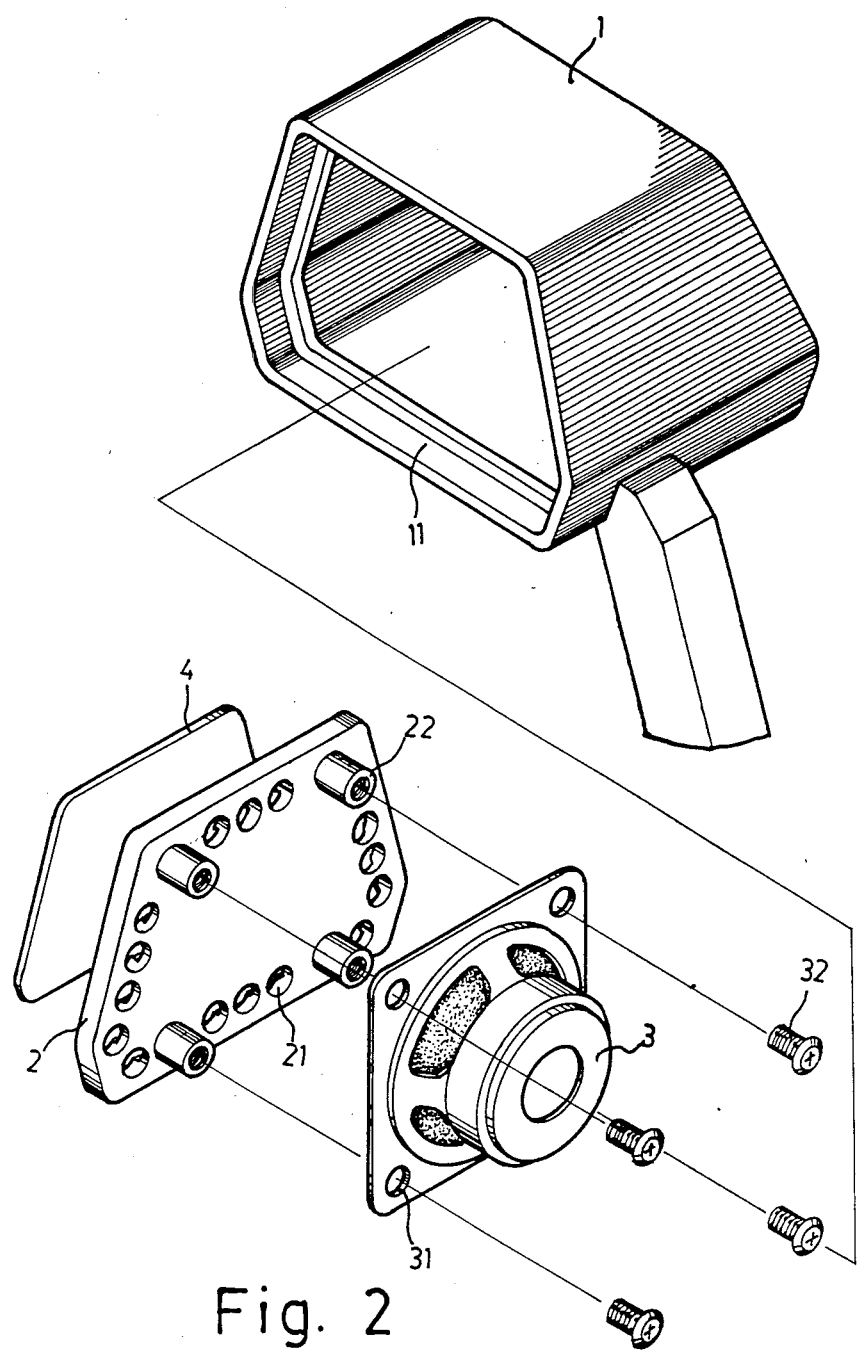
FIG. 2 is an exploded view of the combined loudspeaker and motorcycle driving mirror.

Referring to FIGS. 1 and 2, it can be seen that a combined loudspeaker and motorcycle driving mirror in accordance with the present invention comprises a housing 1, a seat 2, a loudspeaker 3 and a motorcycle driving mirror 4.

The housing 1 for a motorcycle driving mirror is the same as that of the car driving mirror, which is mounted on one or both of the handlebars of a motorcycle. The seat 2 for said motorcycle driving mirror 4 is fixed on a raised member 11 of said housing 1.

The thickness of the raised member 11 is the same as that of the seat 2. Further, the raised member 11 and the seat 2 are both made from plastics material, so that the junction between the raised member 11 and the seat 2 can be formed together by the thermal energy released from ultrasonic wave.

The shape of the seat 2 is designed in according to the shape of housing 1. A plurality of sound apertures 21 are provided on the surface adjacent to the edge of the seat 2, which are provided for the transmission of sound from the loudspeaker 3. The sound aperture 21 has a truncated cone shape, that is, the outer diameter of sound apertures 21 is large than the inner diameter thereof. Due to the shape of the sound apertures 21, rain would be prevented from entering the housing 1 and thus reduce the chances of damaging the loudspeakers 3 and the paper cone thereof.

A screw seat 22 is provided on each corner of the inner side of the seat 2 for tightening a screw 32. Moreover, a recessed channel 23 is provided on the outer side of the seat 2 for positioning the motorcycle driving mirror 4. The motercycle driving mirror has the same shape of the recessed channel 23, so as to wedge into the recessed channel and be fixed thereto.

Figure 3:
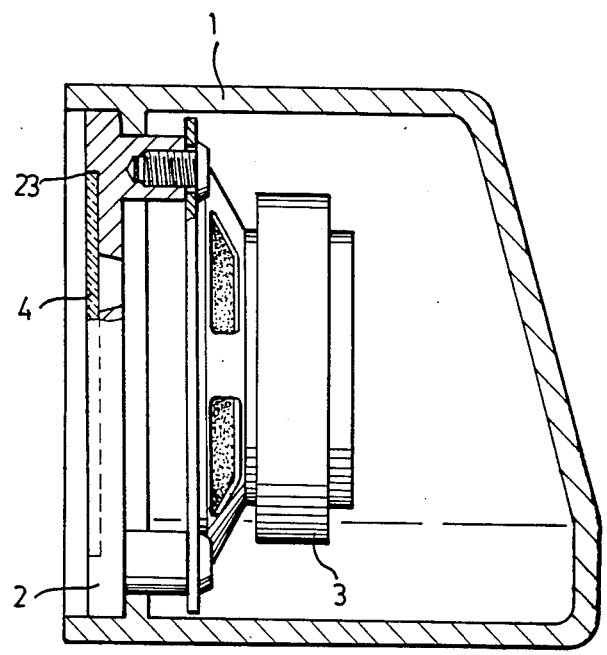
FIG. 3 is a cross-sectional view of the combined loudspeaker and motorcycle driving mirror.

A loudspeaker 3 is designed according to the shape and size of the housing 1, as shown in FIG. 3. There is a threaded hole 31 on each corner of the seat of loudspeaker 3 in order to permit the screw 32 to go through. It is apparent that the loudspeaker 3 is installed on the screw seat 22 of the seat 2 by screws in housing 1. Additionally, the weight of the loudspeaker 3 is about 100 g, and it will not overload the motoycycle driving mirror apparatus while driving on a bumpy road.

I claim:
1. A combined loudspeaker and motorcycle driving mirror comprising:
(a) a housing for a motorcycle driving mirror mounted on one or both of the handlebars of a motorcycle;
(b) a seat for said motorcycle driving mirror fixed on a raised member of said housing;
(c) a loudspeaker installed on said seat by screws in said housing;
(d) a motorcycle driving mirror wedged into a recessed channel of said seat.

2. The combined loudspeaker and motorcycle driving mirror as set forth in claim 1, wherein a plurality of apertures are provided on the surface of said seat for the sound transmission from said loudspeaker.

* * * * *